United States Patent
Mertens (10) Patent No.: US 8,038,134 B2
(45) Date of Patent: Oct. 18, 2011

(54) COMPRESSION SPRING AND METHOD FOR THE PRODUCTION THEREOF

(75) Inventor: Rudy Mertens, Ceroux-Mousty (BE)

(73) Assignee: Bureau Mertens, Ceroux-Mousty (BE)

( * ) Notice: Subject to any disclaimer, the term of this patent is extended or adjusted under 35 U.S.C. 154(b) by 0 days.

(21) Appl. No.: 11/573,957

(22) PCT Filed: Aug. 17, 2005

(86) PCT No.: PCT/EP2005/008910
§ 371 (c)(1),
(2), (4) Date: Dec. 15, 2008

(87) PCT Pub. No.: WO2006/021357
PCT Pub. Date: Mar. 2, 2006

(65) Prior Publication Data
US 2009/0085267 A1    Apr. 2, 2009

(30) Foreign Application Priority Data
Aug. 23, 2004 (EP) .................................. 04019926

(51) Int. Cl.
*F16F 7/00* (2006.01)
(52) U.S. Cl. ..................................... 267/153; 267/141.1
(58) Field of Classification Search .................. 267/140, 267/140.11, 140.13, 153, 292, 294; 248/632, 248/636, 638; 180/300, 312
See application file for complete search history.

(56) References Cited

U.S. PATENT DOCUMENTS

| 4,198,037 A | * | 4/1980 | Anderson | 267/153 |
| 4,566,678 A | * | 1/1986 | Anderson | 267/141.1 |
| 4,899,323 A |   | 2/1990 | Fukahori et al. | |
| 5,205,374 A | * | 4/1993 | Love et al. | 180/300 |
| 5,326,083 A | * | 7/1994 | Wydra et al. | 267/139 |
| 5,868,384 A | * | 2/1999 | Anderson | 267/141.1 |

FOREIGN PATENT DOCUMENTS

| EP | 1240440 | 2/2005 |
| FR | 2 602 293 A1 | 2/1988 |
| GB | 2 180 618 A | 4/1987 |
| JP | 11-210090 | 8/1999 |
| WO | WO-98/46930 A1 | 10/1998 |
| WO | WO-01/34995 A1 | 5/2001 |

* cited by examiner

*Primary Examiner* — Christopher Schwartz
(74) *Attorney, Agent, or Firm* — Connolly Bove Lodge & Hutz LLP (57) ABSTRACT

The inventive compression spring comprises a cylinder (6) which is made of thermoplastic elastomer and is surrounded with an composite assembly comprising n alternating sleeves (4', 5, 17, 18, 19) made of thermoplastic elastomer and (n−1) substantially nondeformable collars (3, 14, 15, 16), wherein each nondeformable collar is sandwiched between two sleeves and encompasses said cylinder and the sleeves are embodied in the form of rings whose lateral faces centered inside the spring.

35 Claims, 7 Drawing Sheets

COMPRESSION SPRING AND METHOD FOR THE PRODUCTION THEREOF

CROSS-REFERENCE TO RELATED APPLICATIONS

This application is a National Stage of PCT application PCT/EP2005/008910 filed Aug. 17, 2005 which in turn claims priority from European Application 04019926.7, filed Aug. 23, 2004 disclosures of which are incorporated herein by reference.

DOMAIN OF THE INVENTION

The invention relates to springs, in particular to compression springs made of an elastomer substance.

PRIOR ART

Documents U.S. Pat. No. 4,198,037, GB-A-2 1890 618 and WO 98/46930 describe elastomer springs which are designed in particular for operation in compression. These springs comprise a body formed from a block which is made of a thermoplastic elastomer and which has been subjected to an appropriate mechanic treatment, including a deformation by compression exceeding the elastic limit of the thermoplastic elastomer, wherein the compression is followed by a reduction of the pressure in the block (decompression). After the decompression, the thermoplastic elastomer block preserves a residual deformation which depends on the amount of the compressive effort and on the selected thermoplastic elastomer.

According to document U.S. Pat. No. 4,198,037, the thermoplastic elastomer body is formed as a solid block. These springs are known to have a generally weak stroke relative to the space taken up by the springs. Moreover, because these springs are hard, the ratio between the compression force and the resulting deformation of the springs is increased.

According to the description in document GB-A-2 180 618, the thermoplastic elastomer body is formed as a hollowed out block which has a generally tubular form. The springs obtained in this manner are generally more flexible than springs obtained as a solid block, but their stroke is improved only slightly. Moreover, they are more difficult to manufacture when such springs have a long length, because they are easily susceptible to a deformation caused by buckling.

Document WO 98/46930 describes a body made of a composite thermoplastic elastomer which includes two elements made of thermoplastic elastomer, wherein one of them has a cylindrical form and is set inside the other element which has an annular form.

The springs obtained according to the documents cited above generally have the form of annular flange with a small height. These springs are generally known to have a weak stroke relative to the amount of space taken up by the springs, which can be an inconvenience for certain application. To provide a remedy for this inconvenience, it has been proposed in the documents U.S. Pat. No. 4,198,037, GB-A-2 180 618 and WO 98/46930 to superimpose several flanges so that metallic disks are interposed between them. The metallic discs are used to create an interlocking flange arrangement in order to form a coherent assembly. For this purpose, catching means are provided on the flanges which can include hollow or uneven contact zones from which thermoplastic elastomer is allowed to flow out of the flanges to create the effect of additional compression. This necessitates the manufacturing of disks which have a complicated profile, including appropriate irregular or hollowed out parts. Moreover, this also means that a matching set of devices must be employed to achieve a correct centering of the stacks of the flanges and of the disks.

Figure 4:
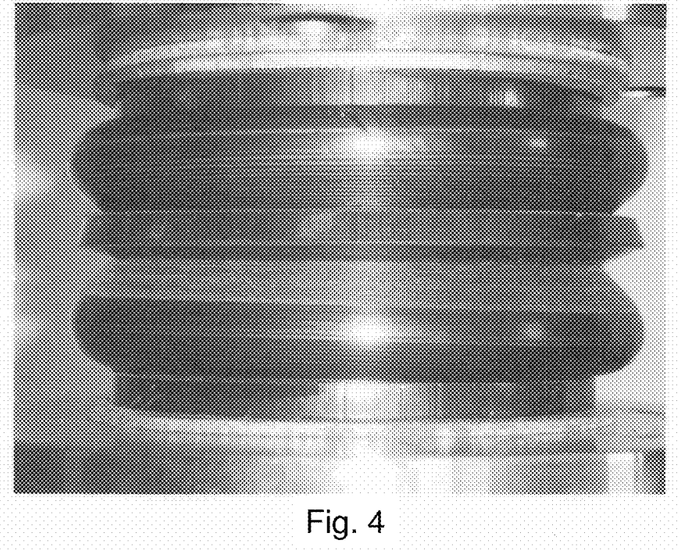
FIGS. 4 and 5 show, in a vertical axial profile section, two successive stages of the method according to the invention applied to the manufacturing of the spring of FIG. 3.

Document WO-01/34995 proposes a spring which remedies this disadvantage of these springs containing stacked up blocks. According to this known spring, which is schematically illustrated by FIG. 4 in document WO-01/34995, the body of the spring is surrounded by a rigid collar before it is subjected to a mechanical treatment of the compression/decompression cited above. During the manufacturing of this known spring, however, the difficulty resulting from a correct adjustment of the collar is encountered again, as the collar must be maintained in its position before and during said mechanical treatment.

Document FR-2 602 293 concerns antiseismic devices associated with elastic elements which are provided with shock absorbing elements. The document describes an apparatus comprising a cylindrical core made of a visco-elastic material, which is set in a composite assembly formed by sleeves made of an elastic material, alternating with collars which are made from non-deformable material.

SUMMARY OF THE INVENTION

The purpose of the invention is to provide a remedy for the inconveniences and disadvantages of known springs described above by providing a compression spring which has an improved performance and which is easier to manufacture.

The invention is in particular directed to a compression spring that is formed by a stack of annular flanges made of thermoplastic elastomer whose manufacturing is easier and less onerous that that of the known springs described above.

Consequently, the invention relates to a compression springs comprising a cylinder made of thermoplastic elastomer, which is set inside a composite assembly comprising n sleeves made of thermoplastic elastomer alternating with (n−1) collars(s) which are substantially non-deformable, so that each non-deformable collar is sandwiched between two said sleeves and encompasses said cylinder; wherein according to the invention, the spring is characterized by the fact that the sleeves are geometrical bodies having the form or rings whose lateral face is curved toward the exterior of the spring.

In the spring according to the invention, the cylinder and the sleeves are made of a thermoplastic elastomer. By definition, a thermoplastic elastomer has elastic characteristics. A thermoplastic elastomer is an elastomer which preserves its elastic characteristics after it has been subjected to a residual deformation caused by plastic flow under the effect of a compression. The elastic characteristics at the compression of a thermoplastic elastomer which has been subjected to residual deformation are normally different from these of an elastomer before the deformation. The thermoplastic elastomers which are well known in this technical sphere are generally synthetic elastomers.

Based on the characteristics stated above, the thermoplastic elastomer selected for the spring according to the invention is not critical for the definition of the invention. Thermoplastic polyesters can be used with advantage. Examples of thermoplastic polyesters which are suitable for the invention belong to the group of copolymers of esters of polyethers. Copolymers obtained by transesterification of an ester derived from phthalic acid and from polyether glycol are very suitable, in particular those that are known under the commercial name HYTREL® (Du Pont). The information concerning these copolymers are in particular well accessible in the document titled Polymer Engineering and Science, December 1974, Vol. 14, No. 12, pages 848 through 852, as well as in the document Encyclopedia of Polymer Science and Technology, Supl. Vol., II, Miley & Son, New York, 1977, pages 484-509. These elastomers which are known under the trademark ARNITEL® are particularly suitable.

In the spring according to the invention, the cylinder is set in a composite assembly comprising n sleeves made of thermoplastic elastomer alternating with (n−1) collars (s) which are substantially non-deformable.

In accordance with the invention, n designates an integer which is equal to at least 2. In the case when n=2, the spring comprises a single collar which is substantially non-deformable and which is sandwiched between two sleeves. In the case when n is more than 2, the spring according to the invention comprises several substantially non-deformable collars which are alternating with the sleeves in such a way that each of said substantially non-deformable collars is sandwiched between two sleeves.

The expression "substantially non-deformable collar" is used to designate a collar or a ring whose inner diameter does not undergo a substantial change during the manufacturing of the spring (the manufacturing of the spring and the expression "whose inner diameter does not undergo a substantial change during the manufacturing of the spring" are explained below). It is preferred when each substantially non-deformable collar according to the invention is rigid. The collar is generally made of a metal, although another suitable material can be also used.

The designation employed in the present description for each substantially non-deformable collar for simplicity's sake is "a non-deformable collar".

In the spring according to the invention, the sleeves are rings whose lateral face is curved in such a way that they are linked with the flanges as mentioned above in reference to document WO 98/46930. The form of the sleeves will be explained in more detail during the course of the description following their manufacturing.

The dimensions of the sleeves are not critical for the definition of the invention. The dimensions will depend on the characteristics that are sought for the spring, which will be in turn determined by the desired application of the spring. They can be determined in each particular case by a person in the art.

In the spring according to the invention, n sleeves form a series of n annular flanges encompassing the cylinder, wherein the cylinder is used jointly with n sleeves. The spring according to the invention includes at least two annular flanges separated by a non-deformable collar encompassing the cylinder. In another variant, the spring according to the invention can include more than two superimposed annular flanges. In the particular case when the spring according to the invention comprises three annular flanges (n=3), the flanges are alternating with the non-deformable collars which encompass the cylinder and which are sandwiched between three sleeves made of thermoplastic elastomer. In the particular case when the spring according to the invention comprises four annular flanges (n=4), the flanges are alternating with three non-deformable collars which encompass the cylinder and which are sandwiched, respectively, between four sleeves made of thermoplastic elastomer.

In principle, there is no particular upper limit for the value of the number n for the definition of the invention. In practice, however, the number n is limited by the need to ensure the mechanical stability of the spring, in particular its resistance to buckling under normal usage conditions. The upper limit of the number n will therefore depend on various parameters, in particular on the diameter of the flanges, their thickness and the thermoplastic elastomer which is employed. It should be determined in each particular case by a person in the art.

In the spring according to the invention, the cylinder and the sleeves can be made of the same thermoplastic elastomer. The invention, however, is also applicable to all cases when the thermoplastic elastomer of the cylinder is different from that which is used in the sleeves. Similarly, the sleeves can be realized with the same thermoplastic elastomer or with different thermoplastic elastomers.

In one preferred embodiment form of the spring according to the invention, the cylinder forms inside the spring n superimposed circular flanges, which are alternating with a non-deformable collar or collars, which encloses or enclose the cylinder. In this form of the realization of the spring, the inner circular face of the sleeves is concave and the lateral face of each circular flange is curved and it fits into the concave face of a sleeve.

This particular embodiment form of the spring according to the invention will become evident during the description below of the manufacturing method of the spring according to the invention.

In the spring according to the invention, the non-deformable collar or each non-deformable collar, the cylinder and the sleeves are generally rotatable about a common axis.

In the spring according to the invention, the cylinder made of thermoplastic cylinder can be a solid or tubular cylinder.

In a particular embodiment form of the spring according to the invention, the cylinder which is made of thermoplastic elastomer is a tubular cylinder, wherein a non-deformable bar is inserted inside said tubular cylinder so that it is in contact with at least one part of its inner wall. In this embodiment form of the invention, the function of the non-deformable bar is to increase the resistance of the spring to buckling. The bar is designed in order to provide a great resistance to bending, and it is advantageously made of a metal, for example steel, while other suitable materials can be also employed. The bar can be a solid bar or a tube. This form of realization of the invention makes it possible to realize springs which have a long length, comprising a number of raised annular flanges superimposed on each other.

In a modified embodiment form of the spring according to the invention, the thermoplastic elastomer cylinder has a composite form comprising a cylindrical core which is set in a sheath. In this embodiment form of the invention, the sheath and its cylindrical core are used jointly with an assembly of sleeves and with the collar(s), and the sheath is encompassed by one or by each collar. In this embodiment form, the thermoplastic elastomer in the sheath can be made of the same or different material that is used in the cylindrical core. Moreover, the cylindrical core can be a solid cylinder or a tubular core.

In a variant of the embodiment form which was just described, the cylindrical core which is set in a sheath has a tubular form, and a non-deformable bar is deployed so that it is inserted in a tubular core and is in contact with at least one part of its internal wall. In this variant of the invention, the function of the non-deformable bar is to increase the resistance of the spring to buckling. The bar is designed to provide a great resistance to bending, and it is advantageously made of a metal, for example steel, while other suitable materials can be also employed. The bar can be a solid bar or a tube. This embodiment form of the invention makes it possible to realize springs which have a long length, comprising a number of raised annular flanges superimposed on each other.

In a supplementary embodiment form of the spring according to the invention, each sleeve is set in a peripheral sleeve, or in an assembly having at least two peripheral sheaths which are mutually mounted in each other.

The spring according to the invention is manufactured by means of a new inventive method which is derived from the manufacturing methods described in the documents U.S. Pat. No. 4,198,037, GB-A-2 180 618 and WO 98/46930, wherein these methods are perfected.

The invention further also relates to a method for the manufacturing of a compression spring in accordance with the invention, as described above. According to this method, a cylinder made of a thermoplastic elastomer is set in a tubular assembly comprising n sleeves made of thermoplastic elastomer with (n−1) collar(s), which are substantially non-deformable, in such a way that the collar or each collar are sandwiched between a pair of said sleeves; so that after that, the composite body obtained in this manner is subjected to a compressive effort which is sufficient to provoke a residual deformation of the cylinder, and the effort is then relaxed.

According to a method in accordance with the invention, n designates an integral which is equal at least to 2. The value of the integer n was clarified above in the definition of the spring according to the invention.

In the present description, the word "cylinder" designates a geometric surface defined by the displacement of a geometric line (the generating line) parallel to the surface, along another geometric line (the directing line), which is located entirely in a geometric plane. The directing line is preferably a circumference, an ellipse or a polygon, and the generating line is preferably a straight line. In the case of a polygon, a regular polygon is preferred. Rotatable bodies are preferred, mainly right cylinders (whose directing line is a circumference) and right prisms.

Based on an n which is equal to or higher than 2, a single non-deformable collar or several (at least two) non-deformable collars can be realized. The dimensions and the profile of the collar, or of each collar, and of the sleeves forming the tubular assembly must be compatible with the dimensions and with the profile of the cylinder in such a way that the cylinder can be set in or introduced inside said tubular assembly. In other words, the cylinder must be capable at least of sliding in each collar and in the sleeves. The collar and the sleeves can have dimensions which are adjusted with precision according to the dimensions of the cylinder in such a way that once the latter is set in the tubular assembly, it will be in contact, on one part of or on its entire peripheral surface with the collar or with each collar and with the sleeves. In a variant, a space can be maintained between the internal wall of the tubular assembly and the peripheral surface of the cylinder so that the latter is set in the tubular assembly. Notwithstanding the characteristics which have been stated, the form and the dimensions of the cylinder, of the collar or of each collar and of the sleeves are not critical for the definition of the invention; they will depend on various parameters, in particular on the designated purpose of the springs, their dimensions and the sought characteristics.

According to the invention, it is preferred when the cylinder is a right cylinder and the sleeves are right cylindrical sleeves. The term right cylinder is used to designate a cylinder whose generating line is a straight line. A right cylindrical sleeve is a sleeve whose internal face is a right cylinder.

According to the method in accordance with the invention, the cylinder can be a solid cylinder or a tubular cylinder. It can be a composite cylinder which can be obtained by mounting a cylindrical core made of thermoplastic elastomer into a sheath made of thermoplastic elastomer. In this particular embodiment form of the method according to the invention, the core can be a solid core or a tubular core.

Pressure is exerted on the compression spring transversally to the plane of the collar or of each collar. Its function is to cause deformation of the cylinder and of the sleeves. It should be sufficient to provoke at least a residual deformation of the cylinder. It is preferably sufficient in order to provoke a residual deformation of the cylinder and of the sleeves.

During the compressive effort, the cylinder and the sleeves are subjected to a contraction in the direction of the compressive effort, and to an expansion which is transversal to this direction on either side of the collar or of each collar. The expression "non-deformable collar" has been defined above as a collar or a ring whose inner diameter is not subjected to a substantial change during the manufacturing of the spring. The expression "whose inner diameter is not subjected to a substantial changed during the manufacturing of the spring" means that during the compressive effort clarified above the inner diameter of the collar is not modified, or it is subjected to an expansion that is much smaller than the transversal expansion of said cylinder. The expression "is not modified" means that the internal diameter of the collar will not be increased by more than 5 mm (usually not more than 1 mm) during the compression. The expression "an expansion that is much smaller than the transversal expansion of said cylinder" means that during the compression, the internal diameter of the collar is not increased, the relationship between the increase of the diameter of the collar and of that of the cylinder is generally less than $½$, preferably $1/10$, while values corresponding to less than $1/100$ (in particular $1/250$, for example between $1/500$ and $1/1,000$) are particularly preferred.

In the preceding definition, the internal diameter of the collar is the diameter of a circle whose perimeter is equal to the perimeter of the opening of the sleeve. The outer diameter of the cylinder is the diameter of a circle whose diameter is equal to the external perimeter of the cylinder, in a plane that is transversal to the direction of the compressive effort.

The expansion of the compressive effort is followed by a relaxation thereof so that the composite body (formed by a cylinder, the non-deformable collar or collars and the sleeves) will adopt an intermediary form, which is between the form which they had before the effort has been expanded and the form in the compressed state. This intermediary form is the form of the spring according to the invention, which has been clarified above. It is characterized by the presence of n superimposed curved circles (or annular flanges) made of thermoplastic elastomer, alternating with (n−1) non-deformable collar(s).

According to the method in accordance with the invention, the amount of the compressive effort will depend on the form and on the dimensions of the cylinder, on the collar or on each collar, and on the sleeves, as well as on the thermoplastic elastomer and on the characteristics which are sought for the spring. It should be determined in each case by a person in the art. The information concerning the compressive effort can be accessed in the documents U.S. Pat. No. 4,198,037, GB-A-2 180 618 and WO 98/46930.

While this is not indispensable, in a possible variant, the thermoplastic elastomer of the composite body can be subjected to a suitable thermal treatment before, during, or after the application of the compressive effort. The information concerning the compressive effort can be accessed in the documents U.S. Pat. No. 4,198,037, GB-A-2 180 618 and WO 98/46930.

In a preferred embodiment form of the method according to the invention, the cylinder and the sleeves are rotatable about a common axis and the compressive effort is applied in a direction which is substantially parallel to the direction of the common axis.

According to the method in accordance with the invention, the tubular assembly in which the cylinder is set comprises at least one collar and at least two sleeves. As described above, there is in principle no limit on the number n of the sleeves and on the number (n−1) of the collars. The method according to the invention thus makes it possible to realize in a simple, rapid and economic manner compression springs having a long length (and, as a consequence, a large stroke) and which occupies a small lateral spatial area. According to the method in accordance with the invention, the height of the cylinder and the length of the assembly formed by non-deformable collars and by the sleeves are limited by the need to avoid buckling due to the effect of the compressive effort.

In a particular embodiment form of the invention designed to reduce the risk of buckling, the cylinder is tubular and a non-deformable bar is inserted in the tubular cylinder before the compressive effort is expanded. In this embodiment form of the method according to the invention, the material of the bar is not critical for the definition of the invention. The non-deformable bar can be made for example of metal, wood or synthetic polymer. Steel is very suitable. In the embodiment form of the method according to invention, a lubricant can be introduced between the bar and the tubular cylinder.

According to the method in accordance with the invention, the sleeves glide on the cylinder while a compressive effort is expanded, and also during the course when the pressure is relaxed after the compressive effort has stopped. Moreover, all other things being equal, the amount of the compressive effort depends on the force of the friction which is applied by the sleeves to the cylinder. It has been observed, quite unexpectedly, that the mechanic characteristics of the spring also depend on the friction forces. Based on this unexpected result of the method according to the invention, it has been also found that one can exert an influence on the intrinsic characteristics of the spring, while influencing said friction forces, for example by lubricating the interface of the cylinder with the sleeves or by imparting a suitable ruggedness to this invention.

The method according to the invention makes it possible to modify at will the mechanical characteristics of compression springs made of thermoplastic elastomer with a suitable selection of the form and of the dimensions of the cylinder made of thermoplastic elastomer, as well as of the number of sleeves which are made of thermoplastic elastomer and of the non-deformable collars. It enables the manufacturing of springs which have a great variety of characteristics, in particular hard springs, flexible springs, springs provided with a long stroke and springs provided with a short stroke. By definition, the hardness of a spring is determined by the relationship between the force of the compression necessary to deform the spring and the deformation that is sustained by the spring. The stroke of a spring is the deformation sustained as a result of the action of the maximum admissible compressive force (without provoking a supplementary residual deformation).

The method according to the invention also facilitates inexpensive manufacturing of an extended range of compression springs by combining elements which can be selected in a suitable manner from a limited number of cores, tubes, sleeves and sheaths manufactured ahead of time from thermoplastic elastomer. Moreover, when the elements have been assembled together, said elements can be mutually integrated with a single compressive operation.

Another advantage provided by the method according to the invention is a reduced cost of the manufacturing of compression springs from elastomer. Extrusion or molding of tubes or cylinders having a small thickness, which can be combined to form a composite body, is generally easier to achieve and less complicated than the manufacturing of a single body which has a large thickness.

BRIEF DESCRIPTION OF FIGURES

Specific details of the invention will become evident from the following description of the attached figures which represent some of the particular embodiment terms of the invention.

The figures are not drawn according to scale.

Generally, the same reference numbers designate the same elements.

DETAILED DESCRIPTION OF PARTICULAR EMBODIMENT MODES

Figure 1:
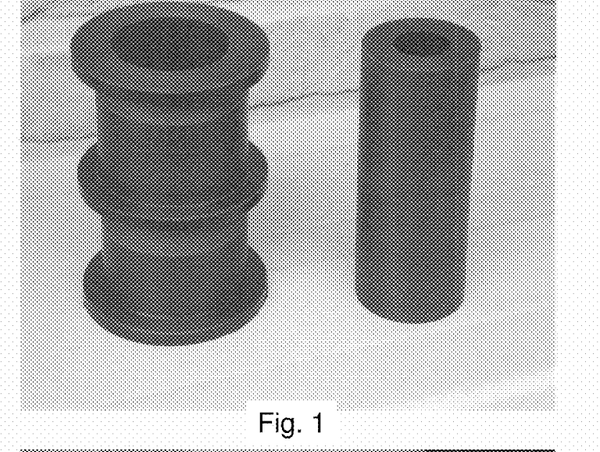
FIG. 1 shows, in an axial profile section, a basic spring according to prior art.

FIG. 1 shows a spring prior to the invention, described in document WO 98/46930. It consists of an annular flange 10, formed by a tubular cylinder 11 in a curved sleeve 12.

Figure 2:
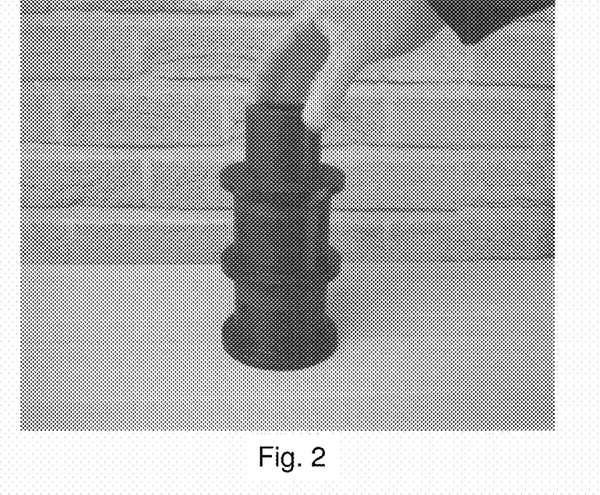
FIG. 2 shows another spring according to prior art.

FIG. 2 shows another spring prior to the invention. This spring consists of a pair of individual annular flanges 10 which are provided with a metallic disk 13 interposed between them. The two flanges 10 are identical to those of FIG. 1 and they are integrated with the disk 13 with mechanical bonding or anchoring.

Figure 3:
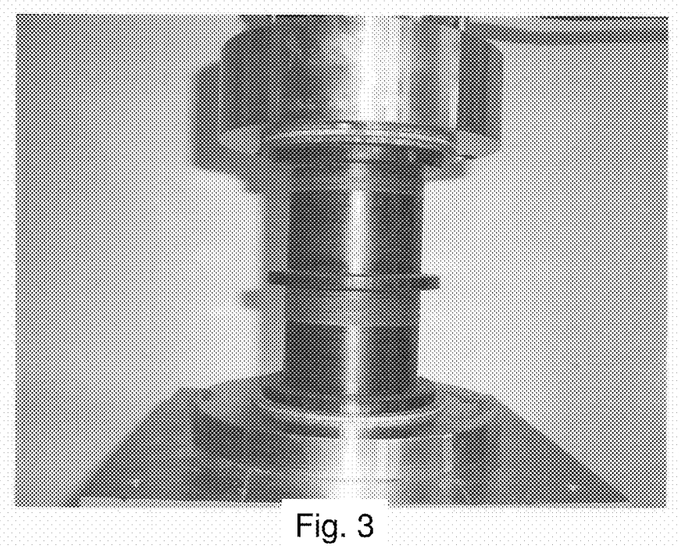
FIG. 3 shows, in a view that is analogous to FIG. 2, a first embodiment form of the spring according to the invention.

The spring illustrated by FIG. 3 is a spring according to the invention. It comprises two annular flanges 1 and 2 which are provided with a steel collar 3 on each other side. The collar 3 is sandwiched between two curved sleeves 4 and 5 and it encloses a cylinder 6. The sleeves 4 and 5 and the cylinder 6 are made of a thermoplastic elastomer, wherein thermoplastic elastomer ARNITEL® can be used with advantage for this purpose. In a variant, the sleeves 4 and 5 can be made of elastomer ARNITEL® and the cylinder 6 can be made of thermoplastic elastomer HYTREL®, or vice versa. The cylinder 6 is a tubular cylinder which is rotatable about an axis X. It is produced by a generating line 8 in an undulating form having the shape of double V, on each side of the collar 3. Each of the two sleeves 4 and 5, which are rotatable about an axis x, is generated by a generating line 8 in the form of the letter V. The cylinder 6 is thus set in these two sleeves 4 and 5 which are in contact with the cylinder 6 on its entire surface. The cylinder 6 forms two annular flanges on each side of the collar 3 and the sleeves 5 have an outer lateral face which is curved or convex, while their inner face is concave. The two flanges of the cylinder 6 are inserted, respectively, in the concave face of the two sleeves 4 and 5.

Figure 5:
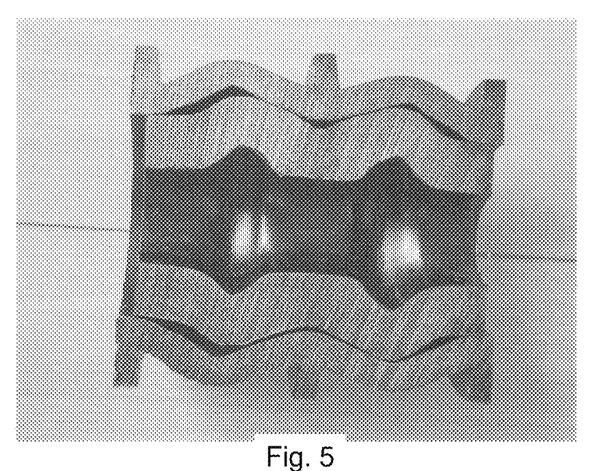

FIGS. 4 and 5 indicate two consecutive stages of the method according to the invention for the manufacturing of the spring of FIG. 3.

As shown in FIG. 4, onto a right tubular cylinder 6, which is made of thermoplastic elastomer, are successively introduced a first right cylindrical sleeve 4 made of thermoplastic elastomer, a metal collar 3 and a second right cylindrical sleeve 5 made of thermoplastic elastomer. The dimensions of the tubular cylinder 6, of the sleeves 4 and 5 and of the collar 3 are selected in such a way that the two sleeves 4 and 5 and the collar 3 slide on the cylinder 6, while their inner diameter is substantially identical to the outer diameter of the tubular cylinder 6.

Once the sleeves 4 and 5 and the collar 3 have been introduced onto tubular cylinder 6, the composite body which is obtained in this manner is compressed between trio plates 9, with a compressive effort F parallel to the common axis X of the tubular cylinder 6 and of the sleeves 4 and 5 (FIG. 5). The force F is sufficient to provoke a residual deformation of the tubular cylinder 6 and of the two sleeves 4 and 5 (FIG. 5). Under the effect of the force F, the outer face of the tubular cylinder 6 glides on the inner face of the sleeves 4 and 5 until the collapsing of the cylinder 6 and of the sleeves 4 and 5 occurs as indicated in FIG. 5. The metal collar 3 (which has been designed in such a way that it is not substantially subjected to deformation under the effect of the force F) is caught so that it is sandwiched between the two sleeves 4 and 5 (FIG. 5).

Immediately after the deformation of the cylinder 6 and of the sleeves 4 and 5 which is schematically indicated in FIG. 5, the compressive effort of compression F is relaxed to allow the thermoplastic elastomer to be released or to become slack. The composite body (which is formed by the cylinder 6, by the two sleeves 4 and 5 and by the collar 3) acquires the profile shown in FIG. 3. The body preserves a residual deformation, wherein its height ($h_3$) (FIG. 3) is an intermediate height, that is to say a height between the height ($h_1$) before the compression (FIG. 4) and height ($h_2$) when compression is being applied (FIG. 5). As far as the mechanical characteristics of the body are concerned (in particular its hardness and its stroke), the spring of FIG. 3 is equivalent to that of FIG. 2 (according to prior art). The manufacturing of the spring of FIG. 3, however, is easier than the manufacturing of the equivalent spring of FIG. 2, which is obtained with the superimposition of two basic springs of FIG. 1. The spring avoids the disadvantages cited above in the text referring to documents U.S. Pat. No. 4,198,037, GB-A-2 180 618 and WO-01/34995, and only one compressive operation is required, in contrast to the methods described in these three documents which necessitate at least two successive compressive operations.

In a variant of the method described while referring to FIGS. 4 and 5, the gliding of the cylinder 6 in the sleeves 4 and 5 is influenced so that their two contacting faces are lubricated to impart the appropriate surface status to them.

Figure 6:
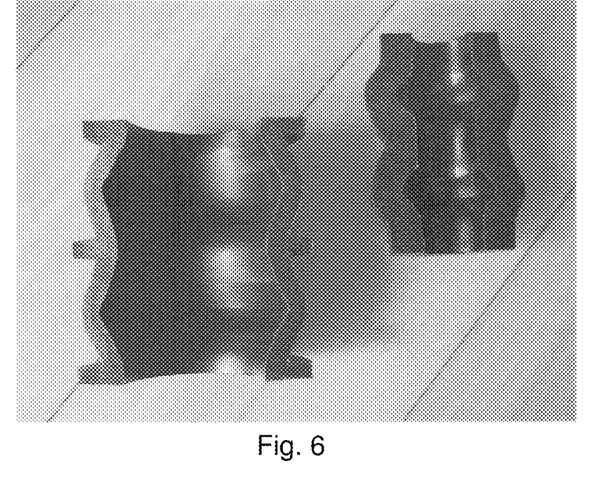
FIGS. 6, 7 and 8 show views, analogous to FIG. 3, of three other embodiment forms of the spring according to the invention.

The spring which is schematically indicated in FIG. 6 differs from spring of FIG. 3 in that the cylinder 6 is consists of a solid core. However, all other things being equal, the spring of FIG. 6 possesses a greater hardness than the spring of FIG. 2.

Figure 7:
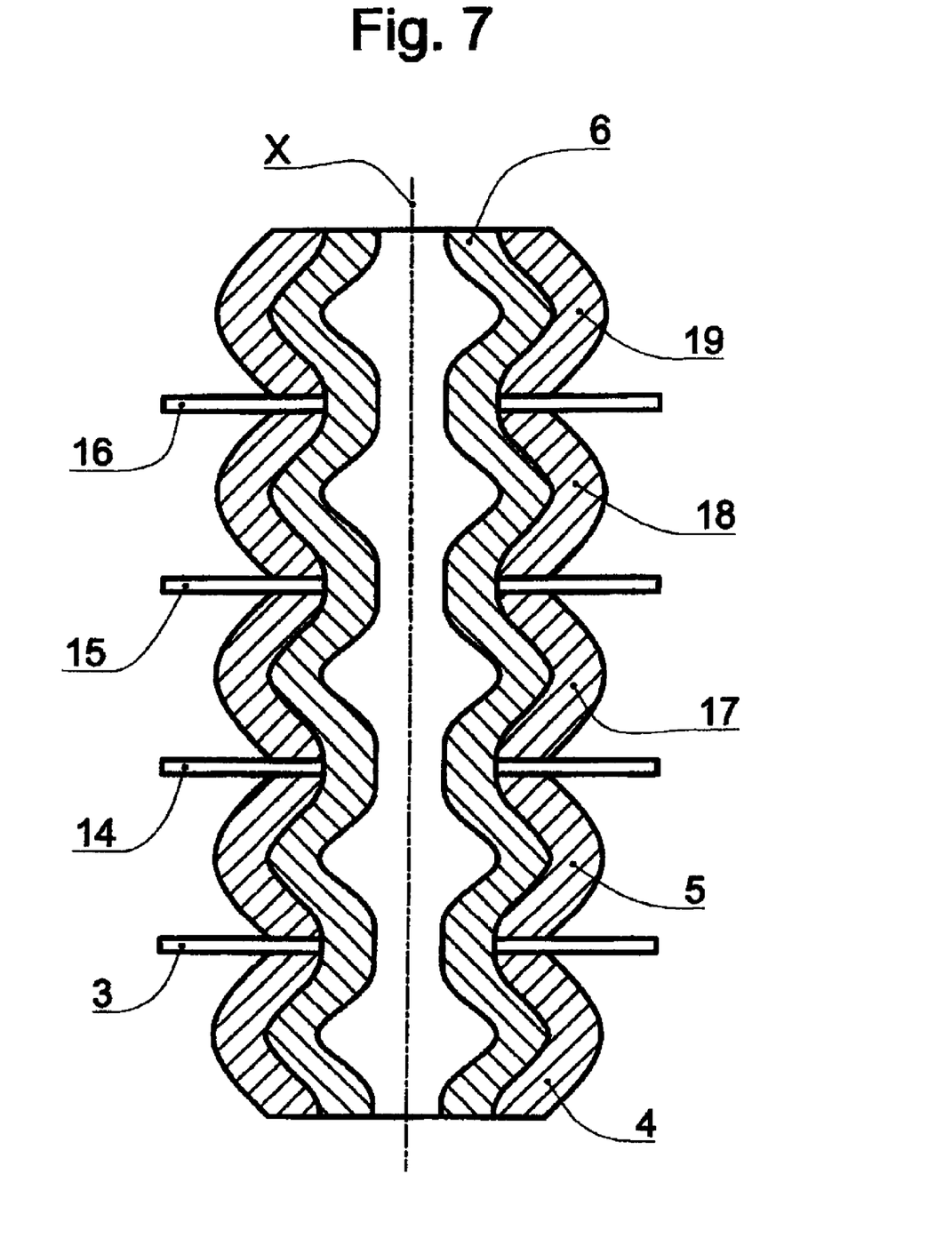

The spring of FIG. 7 comprises four metal collars 3, 14, 15 and 16, which enclose the tubular cylinder 6 and which are alternating with five sleeves 4, 5, 17, 18 and 19.

The spring of FIG. 7 is equivalent to a composite spring, and it is obtained by stacking up five basic springs identical to the spring of FIG. 1.

In order to manufacture the spring of FIG. 7, the operations are performed as described above while referring to FIGS. 4 and 5. Five right cylindrical sleeves are stacked up around a right tubular cylinder while metal collars are interposed between the sleeves. After the stacked construction created in this manner has been compressed and after the compressive effort has been relaxed, as described above, the stacked structure retains a residual deformation and acquires the profile which is schematically indicated in FIG. 7.

Figure 8:
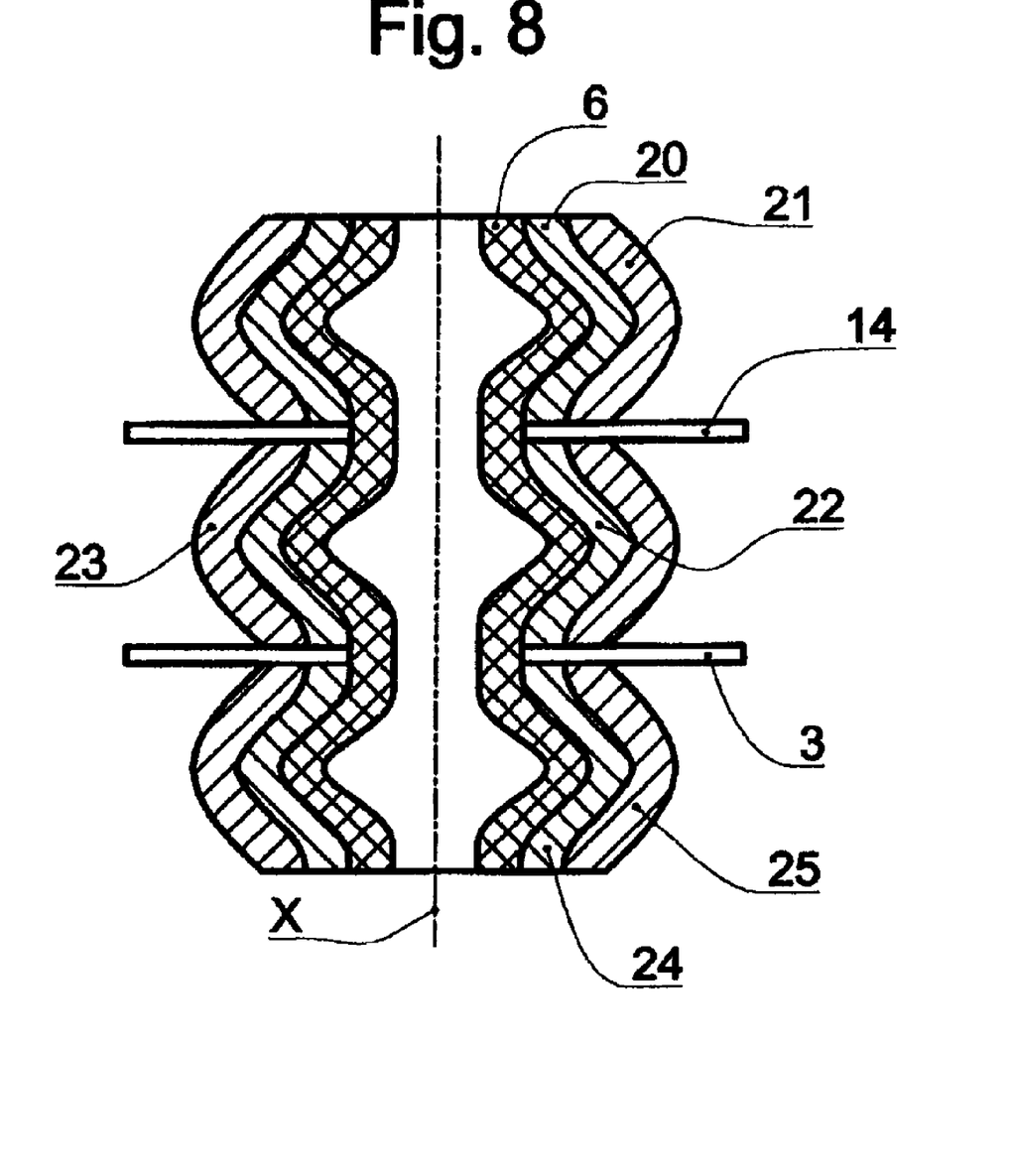

The spring illustrated by FIG. 8 comprises two metal collars 3 and 14, which are disposed around the tubular cylinder 6, and which are sandwiched between three sleeves 20, 22 and 24. Each sleeve 20, 22 and 24 is also set in a sheath 21, 23, 25.

In order to manufacture the spring of FIG. 8, around the right tubular cylinder 6 (FIG. 9) are successively stacked a sleeve 24, which slides on said cylinder 6, a sheath 25, which slides on the sleeve 24, the collar 3, a sleeve 22, which slides on the cylinder 6, a sheath 23, which slides on the sleeve 22, the collar 14, a sleeve 20, which slides on the tubular cylinder 6 and a sheath 21, which slides on the sleeve 20. The stacked structure realized in this manner is then subjected to a compressive effort, which is followed by a relaxation of the compressive effort, as described above in reference to FIGS. 4, 5 and 3.

Figure 9:
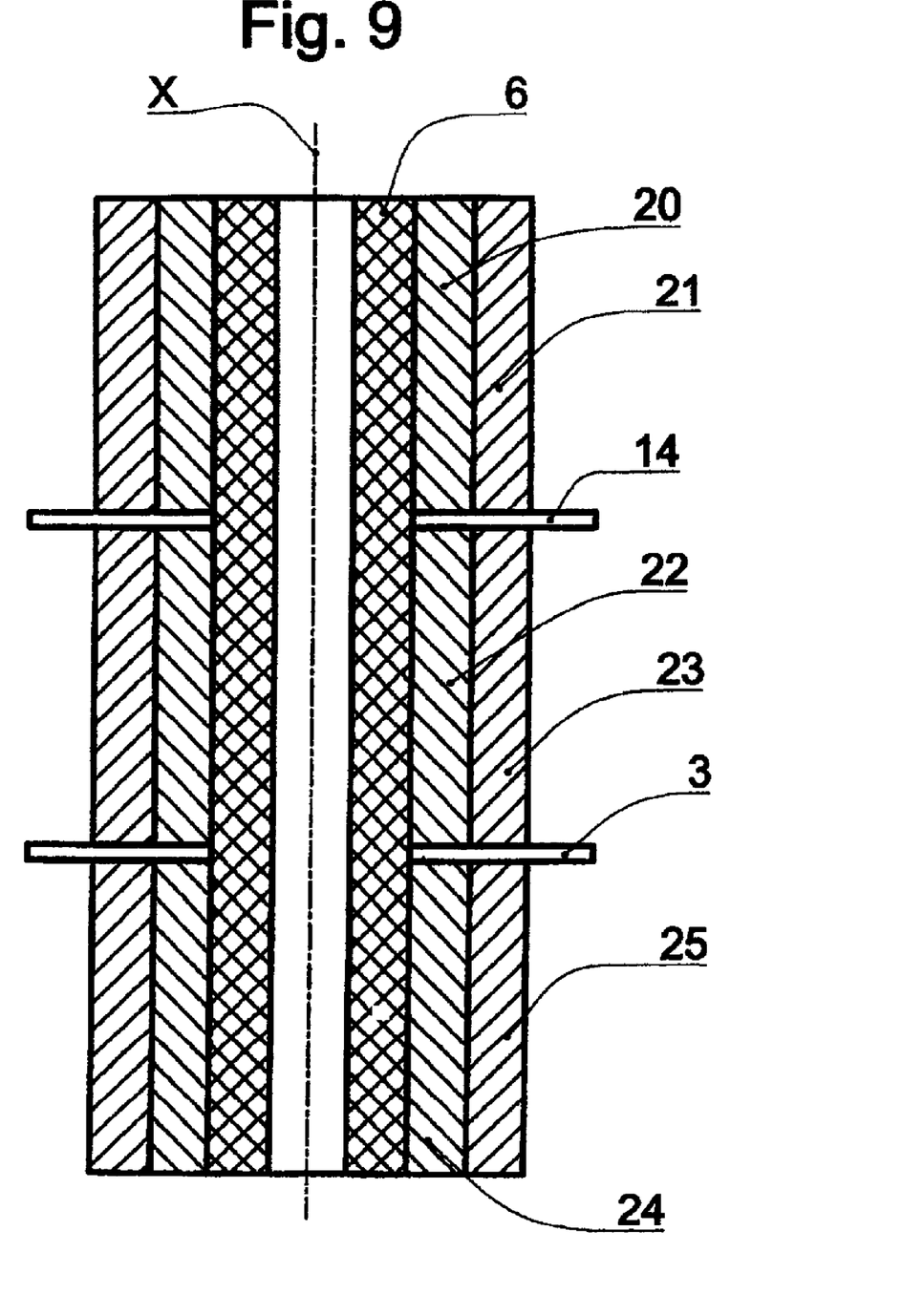
FIG. 9 shows, in a vertical axial profile section, one manufacturing stage of the spring of FIG. 8.

In the modified embodiment forms which are schematically indicated in FIGS. 3, 7 and 9, a metal bar (not shown in the figures) is inserted inside the tubular cylinder 6 before the compressive force F is applied. The function of the bar is to act against buckling of the stacked up structure during compression, as well as during the time when the spring is used. The tubular cylinder 6, which is interposed between the bar and the collars 3 (FIG. 3), 3, 14, 15, 16 (FIG. 7), 3, 14 (FIG. 8), plays the role of a pad when the spring is used, preventing said bar from rubbing against the collars and causing in this manner premature wear and tear of these collars.

Figure 10:
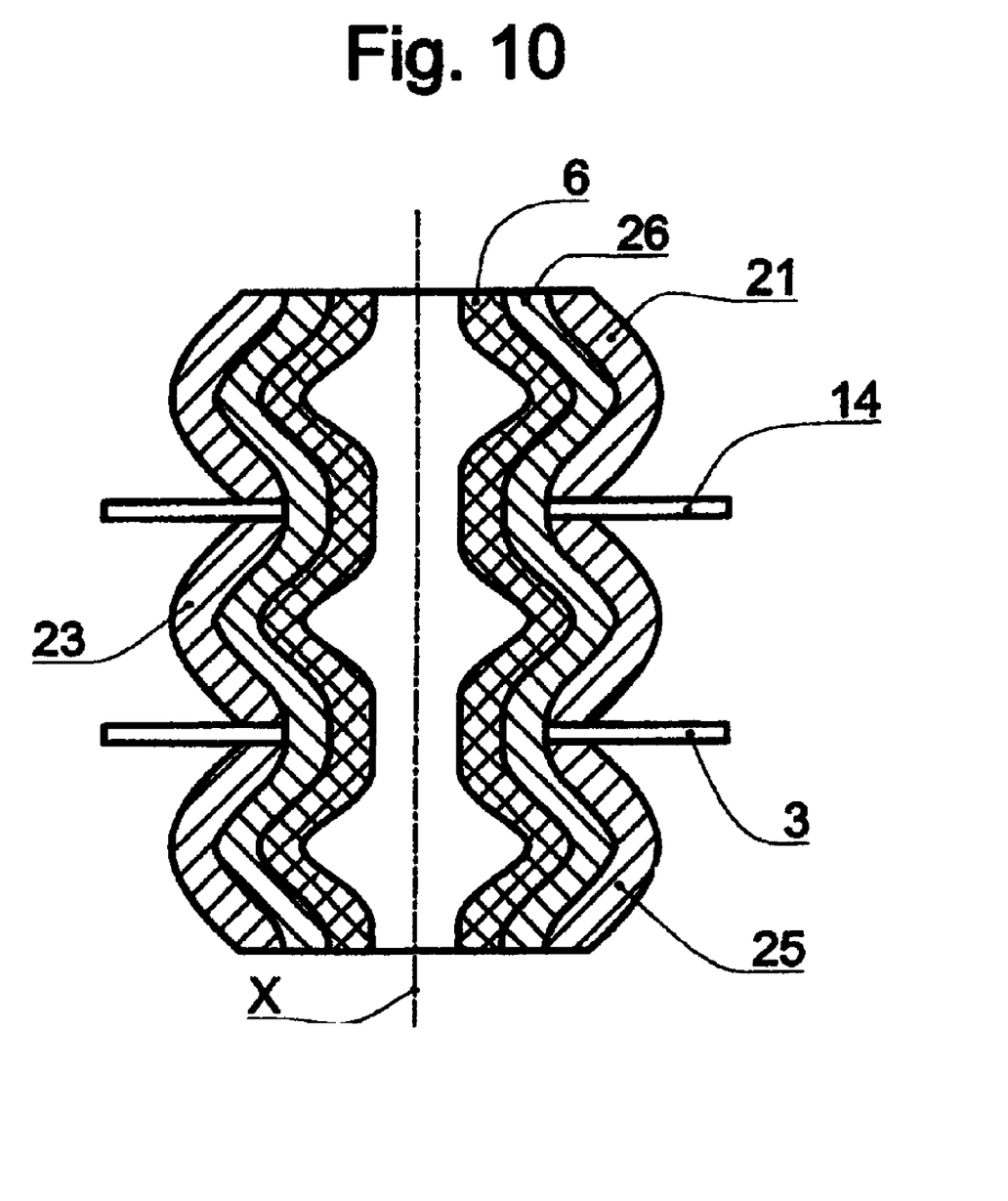
FIG. 10 shows a view, analogous to FIGS. 3, 6, 7 and 8, of another embodiment form of a resort according to the invention.

The cylinder in the spring which is indicated in FIG. 10 is a composite cylinder. It is formed by a cylindrical core 27 [sic] which made of thermoplastic elastomer and set in a sheath 26, also made of a thermoplastic elastomer. The cylindrical core 27 is tubular.

In a variant, a solid cylinder could be used. Two metal collars 3 which encompass the sheath 26 are sandwiched between three sleeves 21, 23 and 25 which are made of thermoplastic elastomer.

In order to manufacture the spring of FIG. 10, a right cylindrical tube 27, made of thermoplastic substance, is set in a right tubular sheath 28, which is also made of a thermoplastic material. After that, onto the sheath 26 are successively introduced a right cylindrical sleeve 25 made of thermoplastic elastomer, a collar 3, a right cylindrical sleeve 23 made of thermoplastic elastomer, a collar 14 and a right cylindrical sleeve 21 made of thermoplastic elastomer. After that, the composite body constituted in this manner is axially compressed with a force that is sufficient to provoke a residual deformation of the cylindrical core 27, of the sheath 26, and of the sleeves 21, 23, 25, in the manner disclosed above with reference to the springs of FIGS. 3 and 8.

The invention claimed is:

1. A composite compression spring comprising an internal cylinder made of a first thermoplastic elastomer, which extends along and inside a composite assembly comprising a set of n sleeves made of a second thermoplastic elastomer alternating with (n−1) collar(s) which are substantially non-deformable, wherein each of the (n−1) collar(s) is sandwiched between two sleeves from among the n sleeves, respectively, and encompasses said cylinder, and wherein said n sleeves are geometrical bodies having the form of a ring whose lateral face is bulging toward the exterior of the spring.

2. The spring according to claim 1, wherein the internal cylinder extends through (n−1) openings provided respectively in the (n−1) collars and shows an alternation of n superimposed bulged flanges which fit respectively in the concave inner circular faces of the n sleeves and (n−1) narrowings which fit into said (n−1) openings of the (n−1) collar(s).

3. The spring according to claim 2, wherein the internal cylinder is a composite cylinder comprising a cylindrical core which is set in at least one sheath.

4. The spring according to claim 2, wherein a non-deformable bar is inserted in the internal cylinder, wherein the internal cylinder is tubular, and wherein the non-deformable bar is in contact with the wall of the internal cylinder.

5. The spring according to claim 2, wherein at least one of the n sleeves is set inside a peripheral sheath or inside of an assembly comprising at least two peripheral sheaths.

6. A method for the manufacturing of a compression spring according to claim 2, comprising:
   superposing n sleeves made of the second thermoplastic elastomer and (n−1) collar(s), which are substantially non-deformable, in such a manner that each collar is sandwiched between two sleeves from among the n sleeves, respectively, to form a tubular assembly having said (n−1) collar(s) alternating with said n sleeves;
   fitting said cylinder made of the first thermoplastic elastomer inside said tubular assembly to form a composite body having said cylinder in said tubular assembly;
   subjecting said composite body to a compressive effort (F) that is sufficient to provoke a residual deformation of the internal cylinder, and
   relaxing said compressive effort (F).

7. The spring according to claim 1, wherein the internal cylinder is a composite cylinder comprising a cylindrical core which is set in at least one sheath.

8. The spring according to claim 7, wherein a non-deformable bar is inserted in the internal cylinder, wherein the internal cylinder is tubular, and wherein the non-deformable bar is in contact with the wall of the internal cylinder.

9. The spring according to claim 7, wherein at least one of the n sleeves is set inside a peripheral sheath or inside of an assembly comprising at least two peripheral sheaths.

10. A method for the manufacturing of a compression spring according to claim 7, comprising:
   superposing n sleeves made of the second thermoplastic elastomer and (n−1) collar(s), which are substantially non-deformable, in such a manner that each collar is sandwiched between two sleeves from among the n sleeves, respectively, to form a tubular assembly having said (n−1) collar(s) alternating with said n sleeves;
   fitting said cylinder made of the first thermoplastic elastomer inside said tubular assembly to form a composite body having said cylinder in said tubular assembly;
   subjecting said composite body to a compressive effort (F) that is sufficient to provoke a residual deformation of the internal cylinder, and
   relaxing said compressive effort (F).

11. The spring according to claim 1, wherein a non-deformable bar is inserted in the internal cylinder, wherein the internal cylinder is tubular, and wherein the non-deformable bar is in contact with the wall of the internal cylinder.

12. The spring according to claim 11, wherein at least one of the n sleeves is set inside a peripheral sheath or inside of an assembly comprising at least two peripheral sheaths.

13. A method for the manufacturing of a compression spring according to claim 11, comprising:
   superposing n sleeves made of the second thermoplastic elastomer and (n−1) collar(s), which are substantially non-deformable, in such a manner that each collar is sandwiched between two sleeves from among the n sleeves, respectively, to form a tubular assembly having said (n−1) collar(s) alternating with said n sleeves;
   subjecting said composite body to a compressive effort (F) that is sufficient to provoke a residual deformation of the internal cylinder, and
   fitting said cylinder made of the first thermoplastic elastomer inside said tubular assembly to form a composite body having said cylinder in said tubular assembly;
   relaxing said compressive effort (F).

14. The spring according to claim 1, wherein at least one of the n sleeves is set inside a peripheral sheath or inside of an assembly comprising at least two peripheral sheaths.

15. A method for the manufacturing of a compression spring according to claim 14, comprising:
   superposing n sleeves made of the second thermoplastic elastomer and (n−1) collar(s), which are substantially non-deformable, in such a manner that each collar is sandwiched between two sleeves from among the n sleeves, respectively, to form a tubular assembly having said (n−1) collar(s) alternating with said n sleeves;
   fitting said cylinder made of the first thermoplastic elastomer inside said tubular assembly to form a composite body having said cylinder in said tubular assembly;
   subjecting said composite body to a compressive effort (F) that is sufficient to provoke a residual deformation of the internal cylinder, and
   relaxing said compressive effort (F).

16. The spring according to claim 1, wherein n is equal to at least 3.

17. The spring according to claim 16, wherein the internal cylinder goes through at least two openings provided respectively in at least two collars and shows an alternation of, on the one hand, at least three superimposed bulged flanges which fit respectively in the concave inner circular faces of at least three sleeves and, on the other hand, at least two narrowings which fit into said at least two openings of said at least two collars.

18. The spring according to claim 1, wherein the (n−1) collars are rigid and made of a substantially non-deformable material.

19. The spring according to claim 1, wherein the (n−1) collars are made of metal.

20. A method for the manufacturing of a composite compression spring, which comprises:
   superposing n sleeves of a first thermoplastic elastomer and (n−1) collar(s), which are substantially non-deformable, in such a manner that each collar is sandwiched between two sleeves from among the n sleeves, respectively, to form a tubular assembly having said (n−1) collar(s) alternating with said n sleeves;
   fitting a cylinder made of a second thermoplastic elastomer inside said tubular assembly to form a composite body having said cylinder in said tubular assembly;
   subjecting said composite body to a compressive effort (F) that is sufficient to provoke a residual deformation of the cylinder, and
   relaxing said compressive effort (F).

21. The method according to claim 20, wherein the compressive effort (F) is applied in a direction which is substantially parallel to the axis of the internal cylinder.

22. The method according to claim 20, wherein the compressive effort is sufficient to provoke a residual deformation of the internal cylinder and of the n sleeves.

23. The method according to claim 20, wherein the dimensions and the profile of the n sleeves and of the (n−1) collar(s) are selected so that after the internal cylinder has been set in the tubular assembly and before a compressive effort is applied, the internal cylinder is substantially in contact with the n sleeves and with the (n−1) collar(s) on a substantial totality of the internal cylinder's perimeter.

24. The method according to claim 20, wherein a non-deformable, tubular bar is inserted into the internal cylinder before the compressive effort (F) is applied.

25. A method according to claim 20, which comprises selecting rigid collars made of a substantially non-deformable material.

26. A method according to claim 20, which comprises selecting (n−1) substantially non-deformable collar(s) whose inner diameter increases of less than ½ of the increase of the diameter of the cylinder during the compressive effort (F).

27. A method according to claim 20, which comprises selecting (n−1) substantially non-deformable collar(s) whose inner diameter increases of less than 1/250 of the increase of the diameter of the cylinder during the compressive effort (F).

28. A method according to claim 20, which comprises selecting (n−1) substantially non-deformable collar(s) whose inner diameter increases of from 1/500 to 1/1,000 of the increase of the diameter of the cylinder during the compressive effort (F).

29. A method according to claim 20, which comprises selecting (n−1) substantially non-deformable metallic collar(s).

30. A composite compression spring comprising an internal cylinder made of a first thermoplastic elastomer, which extends along and inside a composite assembly comprising a set of n sleeves made of a second thermoplastic elastomer alternating with (n−1) collar(s) which are substantially non-deformable, wherein each of the (n−1) collar(s) is sandwiched between two sleeves from among the n sleeves, respectively, and encompasses said cylinder, and wherein said n sleeves are geometrical bodies having the form of a ring with an external lateral face bulging toward the exterior of the spring, and a concave inner circular face, and
wherein the internal cylinder extends through (n−1) openings provided respectively in the (n−1) collars and shows an alternation of, on the one hand, n superimposed bulged flanges which fit respectively in the concave inner circular faces of the n sleeves and, on the other hand, (n−1) narrowings which fit into said (n−1) openings of the (n−1) collar(s),
wherein said n sleeves and (n−1) collar(s) are closely interlinked by said n bulged flanges of the cylinder fitted in said concave inner circular faces of said n sleeves and by said (n−1) narrowings fitted in said (n−1) openings of said (n−1) collar(s).

31. The spring according to claim 30, wherein the (n−1) collars are rigid and made of a substantially non-deformable material.

32. The spring according to claim 30, wherein n is equal to at least 3.

33. The spring according to claim 32, wherein the internal cylinder goes through at least two openings provided respectively in at least two collars and shows an alternation of, on the one hand, at least three superimposed bulged flanges which fit respectively in the concave inner circular faces of at least three sleeves and, on the other hand, at least two narrowings which fit into said at least two openings of said at least two collars.

34. The spring according to claim 30, wherein the (n−1) collars are made of metal.

35. A method for the manufacturing of a composite compression spring, which comprises:
superposing n sleeves of a first thermoplastic elastomer and (n−1) collar(s), which are substantially non-deformable, about a cylinder made of a second thermoplastic elastomer in such a manner that each collar is sandwiched between two sleeves from among the n sleeves, respectively, to form a tubular assembly having said cylinder inside a tubular assembly of said n sleeves and said (n−1) collar(s);
subjecting said composite body to a compressive effort (F) that is sufficient to provoke a residual deformation of the cylinder, and
relaxing said compressive effort (F).

* * * * *